United States Patent
Abe et al.

(10) Patent No.: US 11,579,480 B2
(45) Date of Patent: Feb. 14, 2023

(54) DISPLAY DEVICE

(71) Applicant: Japan Display Inc., Tokyo (JP)

(72) Inventors: Hiroyuki Abe, Tokyo (JP); Masateru Morimoto, Tokyo (JP); Akihiko Saitoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/655,440

(22) Filed: Mar. 18, 2022

(65) Prior Publication Data

US 2022/0299813 A1   Sep. 22, 2022

(30) Foreign Application Priority Data

Mar. 22, 2021 (JP) .............................. JP2021-047327

(51) Int. Cl.
G02F 1/1333 (2006.01)
G02F 1/1368 (2006.01)

(52) U.S. Cl.
CPC ........ *G02F 1/13338* (2013.01); *G02F 1/1368* (2013.01)

(58) Field of Classification Search
CPC ........................... G02F 1/13338; G02F 1/1368

USPC .............................................. 349/24–28, 116
See application file for complete search history.

(56) References Cited

U.S. PATENT DOCUMENTS

| | | | |
|---|---|---|---|
| 2010/0134735 A1* | 6/2010 | Nakamura | H01L 31/1055 257/53 |
| 2020/0265207 A1 | 8/2020 | Chu et al. | |
| 2021/0042493 A1* | 2/2021 | Lius | G09G 3/3208 |
| 2021/0231990 A1* | 7/2021 | Shu | G02F 1/133548 |

* cited by examiner

*Primary Examiner* — Charles S Chang
(74) *Attorney, Agent, or Firm* — Maier & Maier, PLLC

(57) ABSTRACT

According to one embodiment, a display device includes a first substrate, a second substrate and a liquid crystal layer. The first substrate includes a base, a sensor and a sensor circuit. The sensor is interposed between the base and the liquid crystal layer in a display area including pixels. The sensor outputs a sensing signal corresponding to light incident from alongside the liquid crystal layer. The sensor circuit includes a plurality of switching elements. The pixels include first to third sub-pixels. At least some of elements of the switching elements are arranged in each of areas where the first to third sub-pixels are arranged. A signal line for the sensor, which outputs the sensing signal, is placed on a same layer as a feeding line connected to the sensor.

10 Claims, 12 Drawing Sheets

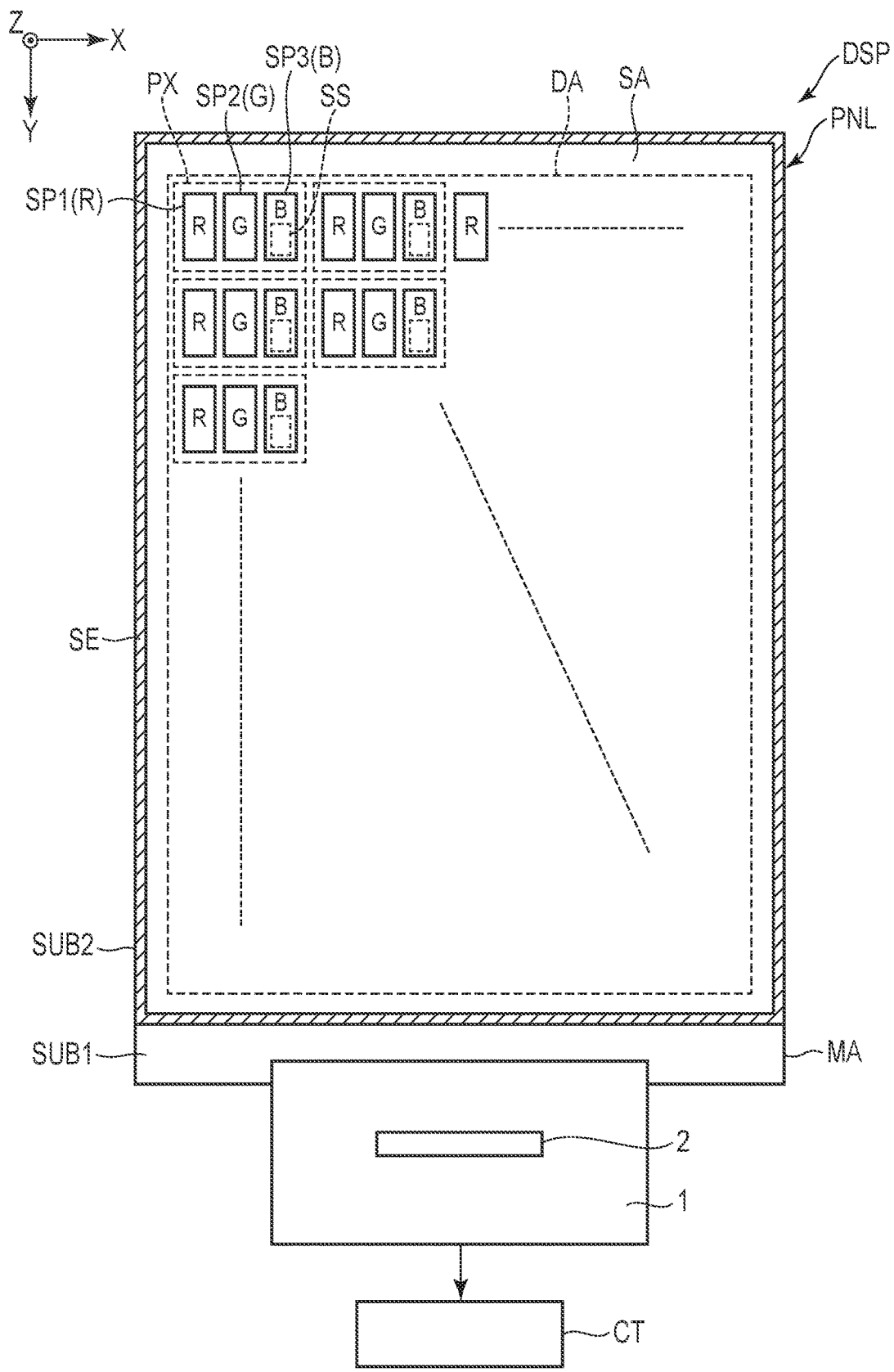
F I G. 2

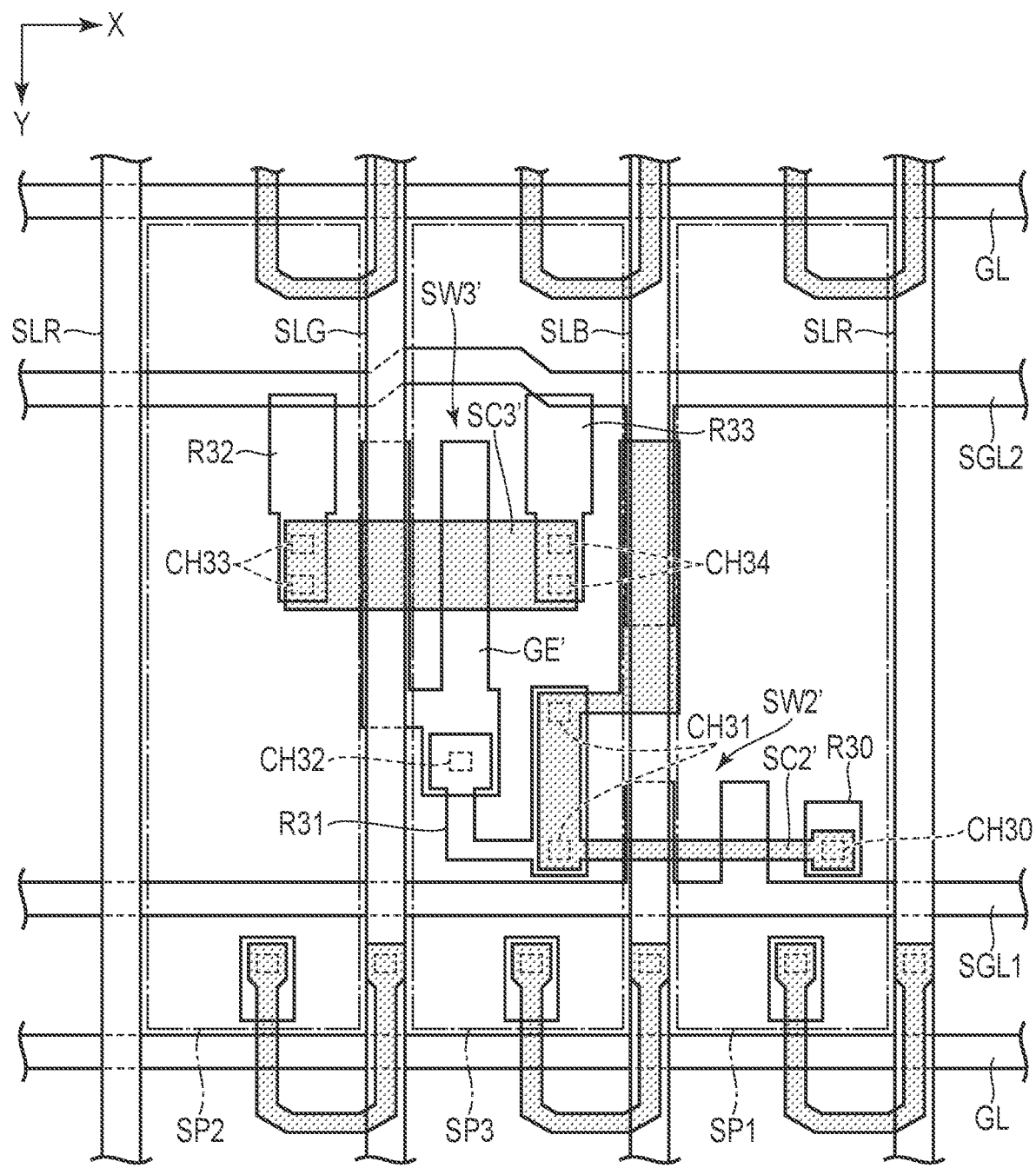
F I G. 11

DISPLAY DEVICE

CROSS-REFERENCE TO RELATED APPLICATIONS

This application is based upon and claims the benefit of priority from Japanese Patent Application No. 2021-047327, filed Mar. 22, 2021, the entire contents of which are incorporated herein by reference.

FIELD

Embodiments described herein relate generally to a display device.

BACKGROUND

In recent years, a display device having a built-in sensor that detects biological information, such as a fingerprint sensor and a vein sensor, has been developed. As this type of sensor, for example, an optical sensor using a photoelectric conversion element is used.

The optical sensor is provided in a pixel in the display device. Accordingly, the aperture ratio of the pixel is lowered and thus the display device is likely to decrease in its display quality.

BRIEF DESCRIPTION OF THE DRAWINGS

FIG. 2 is a schematic plan view of the display device according to the embodiment.

FIG. 11 is a schematic plan view showing a structure of the first substrate to which the sensor circuit of FIG. 10 is applied.

DETAILED DESCRIPTION

Figure 1:
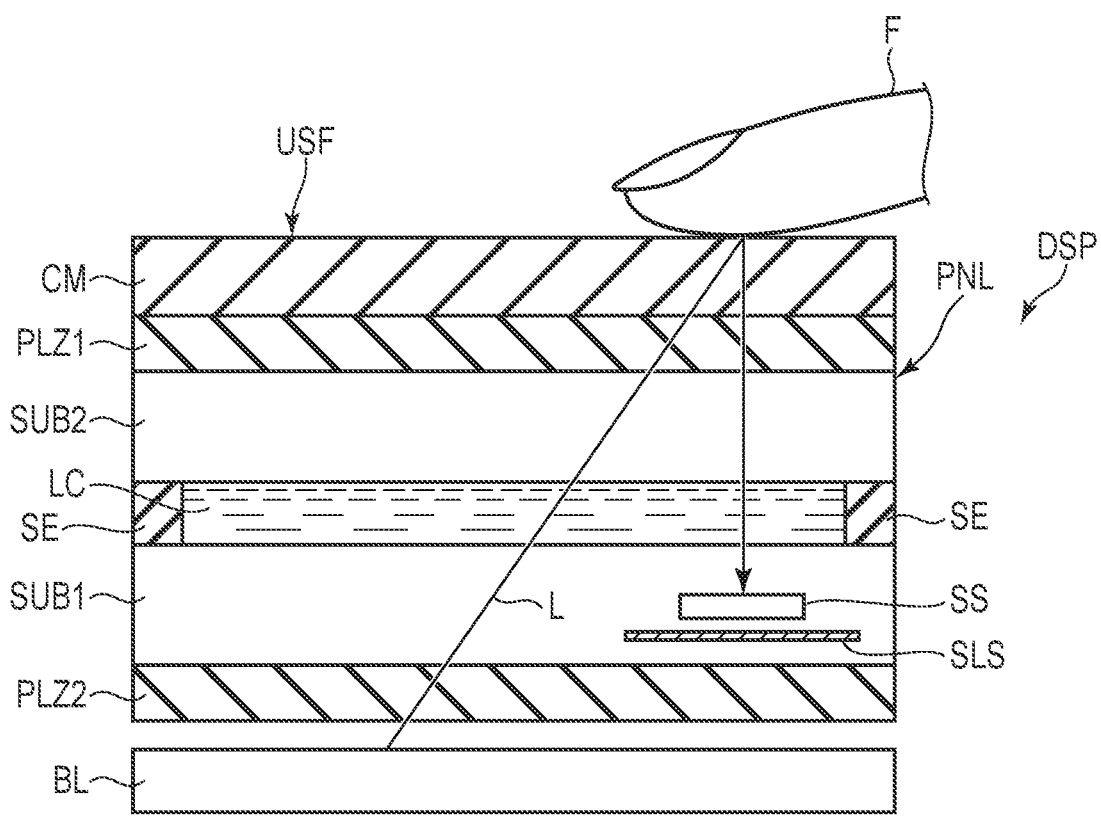
FIG. 1 is a schematic diagram of a display device according to an embodiment.

In general, according to one embodiment, a display device includes a first substrate, a second substrate and a liquid crystal layer. The second substrate is opposed to the first substrate. The liquid crystal layer is interposed between the first substrate and the second substrate. The first substrate includes a base, a sensor and a sensor circuit. The sensor is interposed between the base and the liquid crystal layer in a display area including pixels. The sensor outputs a sensing signal corresponding to light incident from alongside the liquid crystal layer. The sensor circuit includes a plurality of switching elements. The sensor circuit is connected to the sensor. The pixels include a first sub-pixel emitting light of a first color, a second sub-pixel emitting light of a second color and a third sub-pixel emitting light of a third color. At least some of elements of the switching elements are arranged in each of areas where the first sub-pixel, the second sub-pixel and the third sub-pixel are arranged. A signal line for the sensor, which outputs the sensing signal from the sensor, is placed on a same layer as a feeding line connected to the sensor.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Further, in order to make the descriptions more easily understandable, some of the drawings illustrate an X axis, a Y axis and a Z axis orthogonal to each other. A direction along the X axis is referred to as an X direction or a first direction, a direction along the Y axis is referred to as a Y direction or a second direction and direction along the Z axis is referred to as a Z direction or a third direction. A plane defined by the X axis and the Y axis is referred to as an X-Y plane, and a plane defined by the X axis and the Z axis is referred to as an X-Z plane. Further, viewing towards the X-Y plane is referred to as planar view.

FIG. 1 is a schematic diagram showing a display device DSP according to an embodiment. The display device DSP includes a display panel PNL, a cover member CM, a first polarizer PLZ1, a second polarizer PLZ2 and an illumination device BL.

The display panel PNL is a liquid crystal display panel and includes a first substrate SUB1, a second substrate SUB2 opposed to the first substrate SUB1, a sealing member SE and a liquid crystal layer LC. The liquid crystal layer LC is sealed between the first and second substrates SUB1 and SUB2 by the sealing member SE. The display panel PNL of the present embodiment is of a transmission type in which an image is displayed by selectively transmitting light from the back surface side of the first substrate SUB1 to the upper surface side of the second substrate SUB2.

The first substrate SUB1 includes a sensor SS and a light-shielding layer SLS for the sensor. The sensor SS is interposed between the liquid crystal layer LC and the light-shielding layer SLS. Although not shown in FIG. 1, a collimating layer may also be interposed between the sensor SS and the liquid crystal layer LC. The collimating layer is a light-shielding layer and has an opening. Although not shown in FIG. 1, a collimating layer may be formed on the second substrate SUB2.

By the sealing member SE, the first and second substrates SUB1 and SUB2 are bonded to each other. Between the first and second substrates SUB1 and SUB2, a prescribed cell gap is formed by a spacer (not shown). The liquid crystal layer LC is filled in the cell gap.

The cover member CM is provided on the display panel PNL. For example, a glass substrate and a resin substrate can be used as the cover member CM. The cover member CM has an upper surface USF in contact with a target object to be detected by the sensor SS. In the example of FIG. 1, a finger F as an example of the target object is in contact with the upper surface USF. The first polarizer PLZ1 is provided between the display panel PNL1 and the cover member CM.

The illumination device BL is provided under the display panel PNL to irradiates the first substrate SUB1 with light L. The illumination device BL is, for example, a side-edge backlight, and includes a plate-shaped light guide and a plurality of light sources that emit light onto the side surfaces of the light guide. The second polarizer PLZ2 is provided between the display panel PNL and the illumination device BL.

Of the light L, light reflected by finger F enters the sensor SS. Specifically, the reflected light is transmitted through the cover member CM, first polarizer PLZ1, second substrate SUB2, liquid crystal layer LC, and a portion of the first substrate SUB1 which is located above the sensor SS.

The sensor SS outputs a sensing signal corresponding to the incident light. As will be described later, the display panel PNL includes a plurality of sensors SS. In response to the sensing signals of the sensors SS, the surface (for example, a fingerprint) of finger F can be detected.

The sensors SS preferably sense incident light parallel to the normal direction of the upper surface USF in order to obtain a more accurate sensing signal. When the foregoing collimating layers are formed on the first and second substrates SUB1 and SUB2, they can function as collimators that collimate light incident upon the sensors SS.

If the display device DSP is mounted with the sensors SS as described above, it can have a function of a fingerprint sensor. In addition, the sensors SS can be used to detect information on a living body based on light reflected inside finger F in addition to or instead of detecting a fingerprint. The information on a living body is, for example, an image of a blood vessel such as a vein, a pulse, a pulse wave, and the like.

FIG. 2 is a schematic plan view of the display device DSP according to the present embodiment. The display device DSP includes the foregoing display panel PNL and a wiring substrate 1 mounted on the display panel PNL. The display panel PNL includes a display area DA for displaying an image and a surrounding area SA surrounding the display area DA. The surrounding area SA may be referred to as a non-display area.

The first substrate SUB1 includes a mounting area MA which does not overlap the second substrate SUB2. The sealing member SE is located in the surrounding area SA. In FIG. 2, an area where the sealing member SE is placed is indicated by hatching. The display area DA is located inside the sealing member SE. The display panel PNL includes a plurality of pixels PX which are arranged in a matrix in the first and second directions X and Y in the display area DA.

The pixels PX each include a sub-pixel SP1 emitting red (R) light, a sub-pixel SP2 emitting green (G) light, and a sub-pixel SP3 emitting blue (B) light. Note that the pixels PX may include sub-pixels emitting light other than red, green and blue light.

In the example of FIG. 2, one sensor SS is provided for each of the pixels PX. In the entire display area DA, a plurality of sensors SS are arranged in a matrix in the first and second directions X and Y.

The sensor SS need not be located for all the pixels PX. For example, one sensor SS may be provided for a plurality of pixels PX. Further, sensors SS may be provided for the pixels PX in part of the display area DA and may not always be provided for the pixels PX in the other part thereof.

The wiring substrate 1 is, for example, a flexible circuit board, and is connected to a terminal portion that is provided in the mounting area MA. The wiring substrate 1 also includes a driver 2 that drives the display panel PNL. Note that the driver 2 may be mounted in another area such as the mounting area MA. For example, the driver 2 includes an IC that controls a display operation of each of the pixels PX and an IC that controls a sensing operation of the sensors SS. These ICs may be mounted at different locations. The sensors SS output sensing signals to a controller CT via the wiring substrate 1 and the driver 2. In response to the sensing signals from the sensors SS, the controller CT executes an arithmetic operation and the like to detect a fingerprint.

Figure 3:
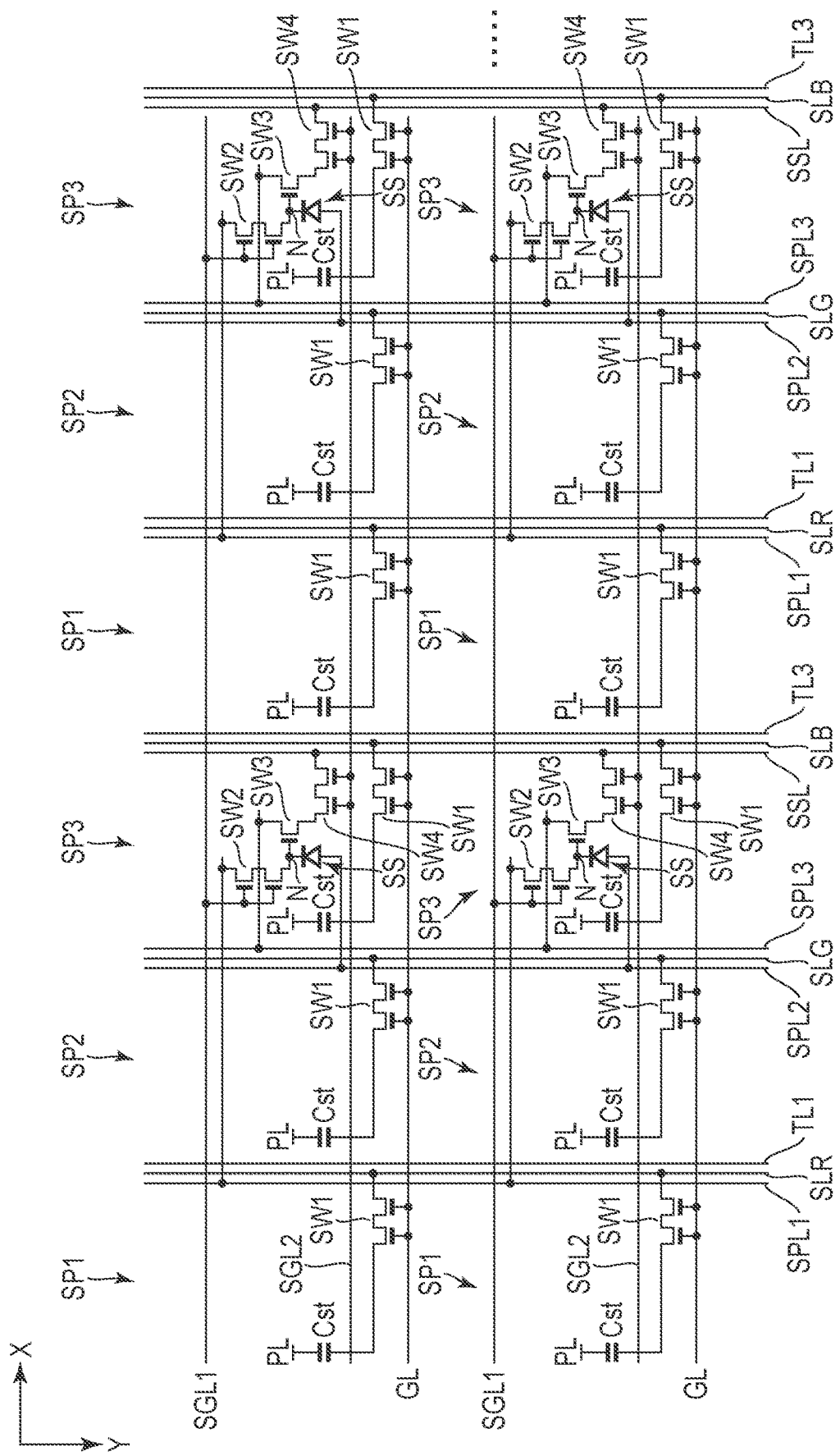
FIG. 3 is an equivalent circuit diagram showing an example of a configuration of a pixel according to the embodiment.

FIG. 3 is an equivalent circuit diagram showing an example of a configuration of sub-pixels SP1, SP2 and SP3 included in the pixel PX according to the present embodiment. The sub-pixels SP1, SP2 and SP3 are arranged in their respective areas partitioned by scanning lines GL extending along the first direction X and arranged along the second direction Y and signal lines SLR, SLG and SLB extending along the second direction Y and arranged along the first direction X. The scanning lines GL may be referred to as pixel scanning lines, and the signal lines SLR, SLG and SLB may be referred to as pixel signal lines. In the following, when a signal line of a specific color is not suggested, the signal line may simply be referred to as a signal line SL. Similarly, in the following, when a sub-pixel of a specific color is not suggested, the sub-pixel may simply be referred to as a sub-pixel SP.

The sub-pixels SP1, SP2 and SP3 each include a switching element SW1. In the switching element SW1, a gate electrode is connected to a scanning line GL, a source electrode is connected to signal lines SLR, SLG and SLB of corresponding colors, and a drain electrode is connected to one of the electrodes of a capacitor Cst. The other electrode of the capacitor Cst is connected to a feeding line PL. The feeding line PL may be referred to as a pixel feeding line.

Sensor circuits are placed mainly in the area including the sub-pixel SP3 that emits blue light, and are connected to the sensors SS to drive the sensors SS. As elements related to the sensors SS, a first scanning line SGL1 for the sensor, a second scanning line SGL2 for the sensor, a first feeding line SPL1 for the sensor, a second feeding line SPL2 for the sensor, a third feeding line SPL3 for the sensor and a signal line SSL for the sensor are provided.

Hereinafter, the first scanning line SGL1 will be referred to as a first scanning line SGL1, the second scanning line SGL2 will be referred to as a second scanning line SGL2, the first feeding line SPL1 will be referred to as a first feeding line SPL1, the second feeding line SPL2 will be referred to as a second feeding line SPL2, and the third feeding line SPL3 will be referred to as a third feeding line SPL3.

The first and second scanning lines SGL1 and SGL2 extend along the first direction X and are arranged along the second direction Y. As will be described later in detail, the first feeding line SPL1 is superposed on the signal line SLR in planar view, the second and third feeding lines SPL2 and SPL3 are superposed on the signal line SLG in planar view, and the signal line SSL is superposed on the signal line SLB in planar view.

The sensor circuits for sensors SS each include a switching element SW2, a switching element SW3 and a switching element SW4. In FIG. 3, the switching elements SW2, SW3 and SW4 are each configured by an n-type thin film transistor (TFT); however, they may be configured by a p-type TFT.

In each of the sensors SS, one electrode is connected to second feeding line SPL2 and the other electrode is connected to a node N. The node N is connected to the drain electrode of the switching element SW2 and the gate electrode of the switching element SW3. The second feeding line SPL2 applies a second voltage (VCOM) is applied to one electrode of the sensor SS. The second voltage may be referred to as a reference voltage. When light enters the sensor SS, capacitance is formed between the electrodes of the sensor SS.

In the switching element SW2, the gate electrode is connected to the first scanning line SGL1, the source electrode is connected to the first feeding line SPL1, and the drain electrode is connected to the node N. When the switching element SW2 is turned on in response to a scanning signal supplied from the first scanning line SGL1, the potential of the node N is reset to the potential of a first voltage (VPP1) applied from the first feeding line SPL1. The second voltage is lower than the first voltage, and the sensor SS is driven by reverse bias.

In the switching element SW3, the gate electrode is connected to the node N, the source electrode is connected to the third feeding line SPL3, and the drain electrode is connected to the source electrode of the switching element SW4. When the switching element SW3 is turned on by the above-described capacitance formed in the sensor SS, it outputs a sensing signal corresponding to the capacitance to the switching element SW4.

In the switching element SW4, the gate electrode is connected to the second scanning line SGL2, the source electrode is connected to the drain electrode of the switching element SW3, and the drain electrode is connected to the signal line SSL. When the switching element SW4 is turned on in response to a scanning signal supplied from the second scanning line SGL2, the switching element SW3 outputs the sensing signal to the signal line SSL.

In addition to the sensors SS, touch detection lines TL1 and TL3 are superposed on the signal lines SLR and SLB in planar view in order to detect whether an external object (for example, finger F) is close to or in contact with the display area DA.

Although FIG. 3 shows a case where the switching elements SW2 and SW4 have a double-gate structure, they may have a single-gate structure or a multi-gate structure.

A structure applicable to the first substrate SUB1 will be described in more detail with reference to FIGS. 4 to 8. FIGS. 4 to 8 are schematic sectional and plan views each showing a configuration of the first substrate SUB1. The locations or shapes of the elements in these figures are not necessarily the same.

Figure 4:
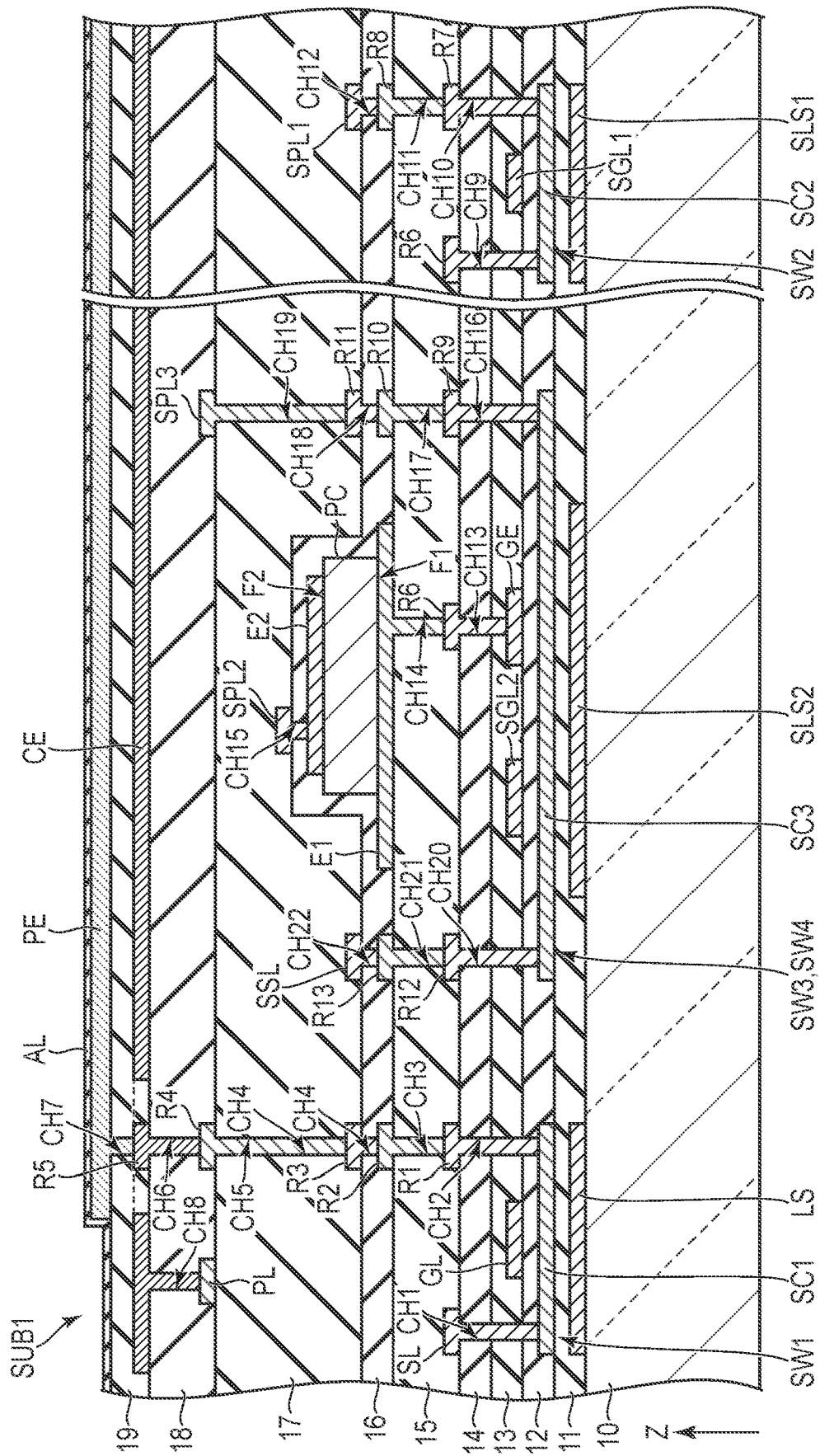
FIG. 4 is a schematic sectional view showing an example of a structure applicable to a first substrate according to the embodiment.

FIG. 4 is a schematic sectional view showing an example of a structure applicable to the first substrate SUB1. The first substrate SUB1 includes a transparent first base 10, insulating layers 11 to 19 and an alignment film AL.

The first base 10 is, for example, a glass substrate and a resin substrate. The insulating layers 11 to 14, 16 and 19 are formed of an inorganic material. The insulating layers 15, 17 and 18 are formed of an organic material. The insulating layers 11 to 19 and the alignment film AL are stacked above the first base 10 in the third direction Z in that order described.

The first substrate SUB1 includes, as elements related to image display, a signal line SL, a scanning line GL, a switching element SW1, a pixel electrode PE, a common electrode CE, relay electrodes R1 to R5 and a feeding line PL. The pixel electrode PE and the switching element SW1 are provided for each of the sub-pixels SP1, SP2 and SP3. The common electrode CE is provided over the sub-pixels SP1, SP2 and SP3, for example.

The switching element SW1 includes a semiconductor layer SC1. The semiconductor layer SC1 is formed between the insulating layers 11 and 12. The scanning line GL is formed between the insulating layers 12 and 13 and opposed to the semiconductor layer SC1. Note that the scanning line GL may be formed in another layer, not between the insulating layers 12 and 13. The signal line SL is formed between the insulating layers 14 and 15, and is in contact with the semiconductor layer SC1 through a contact hole CH1 that penetrates the insulating layers 12, 13 and 14.

In the example of FIG. 4, a light-shielding layer LS is formed between the first base 10 and the insulating layer 11. At least a part of the semiconductor layer SC1, which is opposed to the scanning line GL, is also opposed to the light-shielding layer LS.

The relay electrode R1 is interposed between the insulating layers 14 and 15, and is in contact with the semiconductor layer SC1 through a contact hole CH2 that penetrates the insulating layers 12, 13 and 14. The relay electrode R2 is interposed between the insulating layers 15 and 16, and is in contact with the relay electrode R1 through a contact hole CH3 that penetrates the insulating layer 15. The relay electrode R3 is interposed between the insulating layers 16 and 17, and is in contact with the relay electrode R2 through a contact hole CH4 that penetrates the insulating layer 16. The relay electrode R4 is interposed between the insulating layers 17 and 18, and is in contact with the relay electrode R3 through a contact hole CH5 that penetrates the insulating layer 17. The relay electrode R5 is interposed between the insulating layers 18 and 19, and is in contact with the relay electrode R4 through a contact hole CH6 that penetrates the insulating layer 18.

The pixel electrode PE is interposed between the insulating layer 19 and the alignment film AL, and is in contact with the relay electrode R5 through a contact hole CH7 that penetrates the insulating layer 19. The feeding line PL is interposed between the insulating layers 17 and 18. The common electrode CE is interposed between the insulating layers 18 and 19, and is in contact with the feeding line PL through a contact hole CH8 that penetrates the insulating layer 18.

A common voltage is applied to the feeding line PL. The common voltage is also applied to the common electrode CE. The signal line SL is supplied with a video signal, and the scanning line GL is supplied with a scanning signal. When the scanning line GL is supplied with a scanning signal, the pixel electrode PE is supplied with a video signal from the signal line SL through the semiconductor layer SC1 and the relay electrodes R1 to R5. At this time, an electric field is generated between the pixel electrode PE and the common electrode CE by a difference in potential between the common voltage and the video signal, and this electric field acts on the liquid crystal layer LC.

The first substrate SUB1 includes, as elements related to the sensors SS, a switching element SW2, a first scanning line SGL1, relay electrodes R6 to R8, a first feeding line SPL1, a switching element SW3, a gate electrode GE, a second feeding line SPL2, a switching element SW4, a second scanning line SGL2, relay electrodes R9 to R13, a third feeding line SPL3, and a signal line SSL for the sensor, in addition to the light-shielding layer SLS for the sensor. The sensor SS includes a first electrode E1 (lower electrode), a second electrode E2 (upper electrode), and a photoelectric conversion element PC.

The light-shielding layer SLS includes a first light-shielding layer SLS1 and a second light-shielding layer SLS2. The switching element SW2 includes a semiconductor layer SC2. The semiconductor layer SC2 is formed between the insulating layers 11 and 12. The first scanning line SGL1 is interposed between the insulating layers 12 and 13 and opposed to the semiconductor layer SC2. Note that the first scanning line SGL1 may be formed in another layer, not between the insulating layers 12 and 13.

In the example of FIG. 4, the first light-shielding layer SLS1 is interposed between the first base 10 and the insulating layer 11. At least a part of the semiconductor layer SC2, which is opposed to the first scanning line SGL1, is also opposed to the first light-shielding layer SLS1.

The relay electrode R6 is interposed between the insulating layers 14 and 15, and is in contact with the semiconductor layer SC2 through a contact hole CH9 that penetrates the insulating layers 12, 13 and 14. The relay electrode R7 is interposed between the insulating layers 14 and 15, and is in contact with the semiconductor layer SC2 through a contact hole CH 10 that penetrates the insulating layers 12, 13 and 14. The relay electrode R8 is interposed between the insulating layers 15 and 16, and is in contact with the relay electrode R7 through a contact hole CH11 that penetrates through the insulating layer 15.

The first feeding line SPL1 is interposed between the insulating layers 16 and 17 and is in contact with the relay electrode R8 through a contact hole CH 12 that penetrates the insulating layer 16. A first voltage (VPP1) is applied to the first feeding line SPL1.

The switching element SW3 includes a semiconductor layer SC3. The semiconductor layer SC3 is interposed between the insulating layers 11 and 12. The gate electrode GE is interposed between the insulating layers 12 and 13 and opposed to the semiconductor layer SC3. The gate electrode GE is in contact with the relay electrode R6 through a contact hole CH13 that penetrates the insulating layers 13 and 14.

The photoelectric conversion element PC has a first surface F1 opposed to the first base 10 and a second surface F2 opposed to the liquid crystal layer LC. The photoelectric conversion element PC is located between the insulating layers 15 and 16. The first electrode E1 is interposed between the photoelectric conversion element PC and the insulating layer 15 and is in contact with the first surface F1. The outer periphery of the first electrode E1 protrudes from the photoelectric conversion element PC and is covered with an insulating layer 16. The first electrode E1 is in contact with the relay electrode R6 through a contact hole CH 14 that penetrates the insulating layer 15 below the photoelectric conversion element PC. The second electrode E2 is interposed between the photoelectric conversion element PC and the insulating layer 16 and is in contact with the second surface F2. The second electrode E2 is in contact with the second feeding line SPL2 through a contact hole CH15 that penetrates the insulating layer 16 above the photoelectric conversion element PC.

The second feeding line SPL2 is interposed between the insulating layers 16 and 17, and is in contact with the second electrode E2 through a contact hole CH15 that penetrates the insulating layer 16. A second voltage (VCOM) is applied to the second feeding line SPL2.

The switching element SW4 includes a semiconductor layer SC3. That is, the semiconductor layer SC3 is shared by the switching elements SW3 and SW4. The second scanning line SGL2 is interposed between the insulating layers 12 and 13 and opposed to the semiconductor layer SC3, and does not overlap the gate electrode GE. Note that the second scanning line SGL2 may be formed in another layer, not between the insulating layers 12 and 13.

In the example of FIG. 4, the second light-shielding layer SLS2 is formed between the first base 10 and the insulating layer 11. At least a part of the semiconductor layer SC3, which is opposed to the gate electrode GE and the second scanning line SGL2, is also opposed to the second light-shielding layer SLS2.

The relay electrode R9 is interposed between the insulating layers 14 and 15, and is in contact with the semiconductor layer SC3 through a contact hole CH16 that penetrates the insulating layers 12, 13 and 14. The relay electrode R10 is interposed between the insulating layers 15 and 16, and is in contact with the relay electrode R9 through a contact hole CH17 that penetrates the insulating layer 15. The relay electrode R11 is interposed between the insulating layers 16 and 17, and is in contact with the relay electrode R10 through a contact hole CH18 that penetrates the insulating layer 16.

The third feeding line SPL3 is formed between the insulating layers 17 and 18, and is in contact with the relay electrode R11 through a contact hole CH19 that penetrates the insulating layer 17. A third voltage (VPP2) is applied to the third feeding line SPL3.

The relay electrode R12 is interposed between the insulating layers 14 and 15, and is in contact with the semiconductor layer SC3 through a contact hole CH20 that penetrates the insulating layers 12, 13 and 14. The relay electrode R13 is interposed between the insulating layers 15 and 16, and is in contact with the relay electrode R12 through a contact hole CH21 that penetrates the insulating layer 15.

The signal line SSL for the sensor is formed between the insulating layers 16 and 17, and is in contact with the relay electrode R13 through a contact hole CH22 that penetrates the insulating layer 16.

The light-shielding layers LS and SLS are formed of the same metal material. The signal lines SL and relay electrodes R1, R6, R7, R9 and R12 are formed of the same metal material. The first electrode E1 and relay electrodes R2, R8, R10 and R13 are formed of the same metal material. The first feeding line SPL1, second feeding line SPL2, signal line SSL and relay electrodes R3 and R11 are formed of the same metal material. The feeding line PL, third feeding line SPL3 and relay electrode R4 are formed of the same metal material. The second electrode E2, pixel electrode PE, common electrode CE and relay electrode R5 are formed of a transparent conductive material such as indium tin oxide (ITO).

The first electrode E1, which is formed of a metal material, also functions as a light-shielding layer to suppress light incident from below onto the photoelectric conversion element PC. The photoelectric conversion element PC is, for example, a photodiode, and outputs an electrical signal (sensing signal) corresponding to incident light. More specifically, a positive intrinsic negative (PIN) photodiode can be used as the photoelectric conversion element PC. This type of photodiode includes a p-type semiconductor layer, an i-type semiconductor layer and an n-type semiconductor layer. The p-type semiconductor layer is located alongside the second electrode E2, the n-type semiconductor layer is located alongside the first electrode E1, and the i-type semiconductor layer is located between the p-type and n-type semiconductor layers.

The p-type semiconductor layer, i-type semiconductor layer and n-type semiconductor layer are formed of, for example, amorphous silicon (a-Si). Note that the material of the semiconductor layers is not limited to the amorphous silicon, but the amorphous silicon may be replaced with polycrystalline silicon, microcrystalline silicon, and the like, and the polycrystalline silicon may be replaced with amorphous silicon, microcrystalline silicon, and the like.

The first and second scanning lines SGL1 and SGL2 are each supplied with a scanning signal with timing of sensing by the sensor SS. When the first and second scanning lines SGL1 and SGL2 are supplied with a scanning signal, they output to the signal line SSL a sensing signal to be generated by the photoelectric conversion element PC. The sensing signal output to the signal line SSL is supplied to the controller CT via the driver 2, for example.

Figure 5:
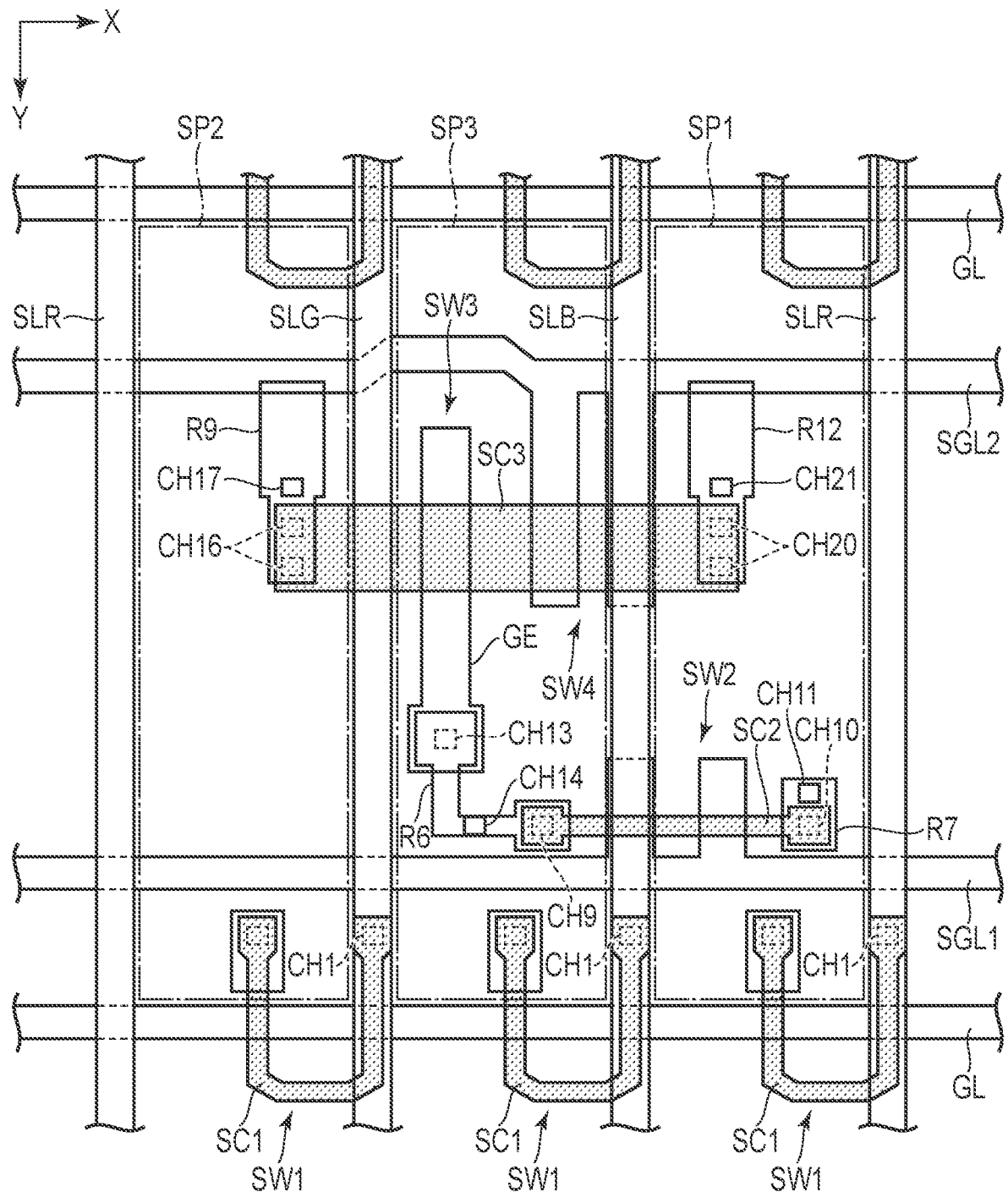
FIG. 5 is a schematic plan view showing an example of a structure applicable to the first substrate according to the embodiment.

FIG. 5 is a schematic plan view showing elements applicable to the first substrate SUB1 and interposed between the insulating layers 12 and 15 shown in FIG. 4. In FIG. 5, contact holes for contacting elements below the signal lines SL are indicated by broken lines, and contact holes for contacting elements above the signal lines SL are indicated by solid lines.

The scanning lines GL, first scanning line SGL1 and second scanning line SGL2 extend along the first direction X and are arranged along the second direction Y. The first and second scanning lines SGL1 and SGL2 are arranged adjacent to each other in the second direction Y. The first and second scanning lines SGL1 and SGL2 are interposed between adjacent two scanning lines GL. The signal lines SL extend along the second direction Y and are arranged along the first direction X.

The sub-pixels SP1, SP2 and SP3 are arranged in an area surrounded by adjacent two scanning lines GL arranged along the second direction Y and adjacent two signal lines SL arranged along the first direction X. The sub-pixels SP1, SP2 and SP3 have their respective openings surrounded by the second scanning line SGL2, the first scanning line SGL1 and the adjacent two signal lines SL.

The first scanning line SGL1 has a branch portion (protruding portion) extending along the second direction Y. The branch portion functions as a gate electrode of the switching element SW2. The semiconductor layer SC2 is formed in an area superposed on the gate electrode of the switching element SW2 in planar view.

The semiconductor layer SC2 is formed across the opening of the sub-pixel SP3 and the opening of the sub-pixel SP1, and overlaps the signal line SLB corresponding to the sub-pixel SP3. An island-shaped relay electrode R7 is placed in the opening of the sub-pixel SP1 to overlap the semiconductor layer SC2. The relay electrode R7 is in contact with the semiconductor layer SC2 through the contact hole CH10. The relay electrode R7 is also in contact with a relay electrode placed above the relay electrode R7 through the contact hole CH11. An island-shaped relay electrode R6 is placed in the opening of the sub-pixel SP3 to overlap the semiconductor layer SC2. The relay electrode R6 is in contact with the semiconductor layer SC2 through the contact hole CH9.

The relay electrode R6 is in contact with the gate electrode GE of the switching element SW3 through the contact hole CH13. The gate electrode GE of the switching element SW3 is placed in the opening of the sub-pixel SP3 to overlap the relay electrode R6 in planar view. Note that the relay electrode R6 is in contact with the first electrode E1, which is placed above the relay electrode R6, through the contact hole CH14.

The second scanning line SGL2 has a branch portion (protruding portion) extending along the second direction Y. The branch portion functions as a gate electrode of the switching element SW4. The semiconductor layer SC3 is formed in an area superposed on the gate electrode of the switching element SW4 in planar view.

The semiconductor layer SC3 is formed across the opening of the sub-pixel SP2, the opening of the sub-pixel SP3 and the opening of the sub-pixel SP1, and overlaps the signal line SLG corresponding to the sub-pixel SP2 and the signal line SLB corresponding to the sub-pixel SP3. An island-shaped relay electrode R9 is placed in an opening of the sub-pixel SP2 to overlap the semiconductor layer SC3. The relay electrode R9 is in contact with the semiconductor layer SC3 through the contact hole CH16. The relay electrode R9 is also in contact with a relay electrode placed above the relay electrode R9 through the contact hole CH17.

An island-shaped relay electrode R12 is placed in an opening of the sub-pixel SP1 to overlap the semiconductor layer SC3. The relay electrode R12 is in contact with the semiconductor layer SC3 through the contact hole CH20. The relay electrode R12 is also in contact with a relay electrode placed above the relay electrode R12 through the contact hole CH21.

The switching element SW1 is interposed between the first scanning line SGL1 and the scanning line GL as an element related to image display. The semiconductor layer SC1 included in the switching element SW1 is in contact with the signal line SL of the corresponding color through the contact hole CH1.

Figure 6:
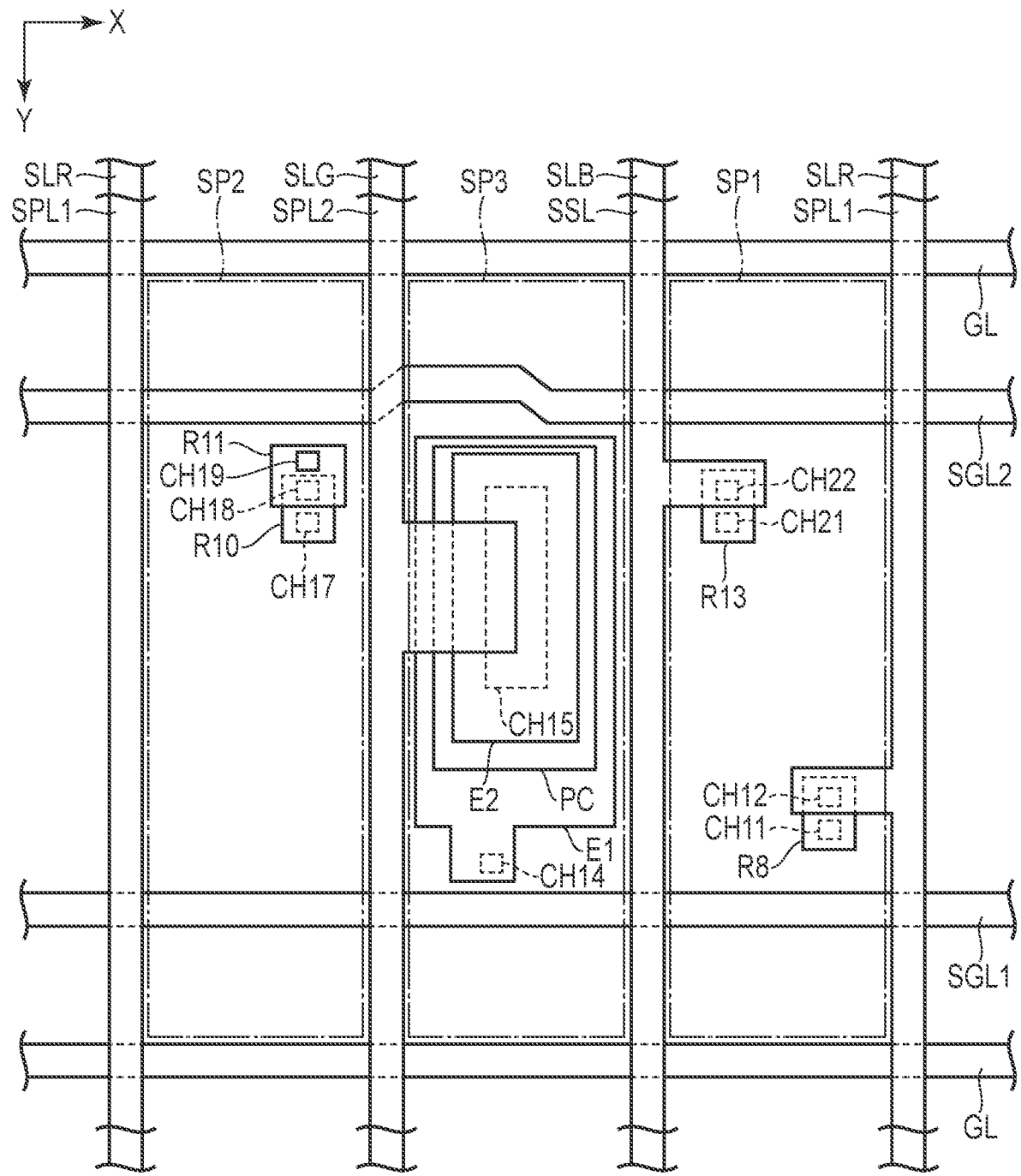
FIG. 6 is a schematic plan view showing an example of a structure applicable to the first substrate according to the embodiment.

FIG. 6 is a schematic plan view showing elements applicable to the first substrate SUB1 and interposed between the insulating layers 16 and 17 shown in FIG. 4. In FIG. 6, contact holes for contacting elements below the first feeding line SPL1, second feeding line SPL2 and signal line SSL are indicated by broken lines, and contact holes for contacting elements above the first feeding line SPL1, second feeding line SPL2 and signal line SSL are indicated by solid lines. FIG. 6 also shows the pixel scanning line GL, pixel signal line SL, the first scanning line SGL1 and second scanning line SGL2 shown in FIG. 5, in order to make the relationship in location among the elements easier to understand.

The first electrode E1 of the sensor SS is placed in the opening of the sub-pixel SP3. The first electrode E1 is in contact with the lower relay electrode R6 through the contact hole CH14. The photoelectric conversion element PC is placed on the first electrode E1. The second electrode E2 of the sensor SS is placed on the photoelectric conversion element PC. The second electrode E2 is in contact with the second feeding line SPL2 through the contact hole CH15. The second feeding line SPL2 extends along the second direction Y so as to be superposed on the signal line SLG corresponding to the sub-pixel SP2 in planar view. The second feeding line SPL2 has a branch portion (protruding portion) extending along the first direction X, and is in contact with the second electrode E2 at the branch portion.

Accordingly, the second feeding line SPL2 and the sensor SS are electrically connected to each other to allow the second voltage (VCOM) to be applied to the sensor SS.

An island-shaped relay electrode R10 is placed in the opening of the sub-pixel SP2. The relay electrode R10 is in contact with the lower relay electrode R9 through the contact hole CH17. The relay electrode R10 is in contact with a relay electrode R11 placed above the relay electrode R10 through a contact hole CH18. The relay electrode R11 is placed in the opening of the sub-pixel SP2 and superposed on the relay electrode R10 in planar view, and is in contact with the lower relay electrode R10 through the contact hole CH18. The relay electrode R11 is in contact with the third feeding line SPL3, which is placed above the relay electrode R11, through the contact hole CH19.

An island-shaped relay electrode R13 is placed in the opening of the sub-pixel SP1. The relay electrode R13 is in contact with the lower relay electrode R12 through the contact hole CH21. The relay electrode R13 is in contact with the signal line SSL, which is placed above the relay electrode R13, through the contact hole CH22. The signal line SSL extends along the second direction Y so as to be superposed on the signal line SLB corresponding to the sub-pixel SP3 in planar view. The signal line SSL has a branch portion (protruding portion) extending along the first direction X, and is in contact with the relay electrode R13 at the branch portion.

An island relay electrode R8 is placed in the opening of the sub-pixel SP1. The relay electrode R8 is in contact with the lower relay electrode R7 through the contact hole CH11. The relay electrode R8 is in contact with the first feeding line SPL1, which is placed above the relay electrode R8, through the contact hole CH12. The first feeding line SPL1 extends along the second direction Y so as to be superposed on the signal line SLR corresponding to the sub-pixel SP1 in planar view. The first feeding line SPL1 has a branch portion (protruding portion) extending along the first direction X, and is in contact with the relay electrode R8 at the branch portion. Accordingly, the first feeding line SPL1 and the switching element SW2 are electrically connected to each other to allow the first voltage (VPP1) to be applied to the switching element SW2.

Figure 7:
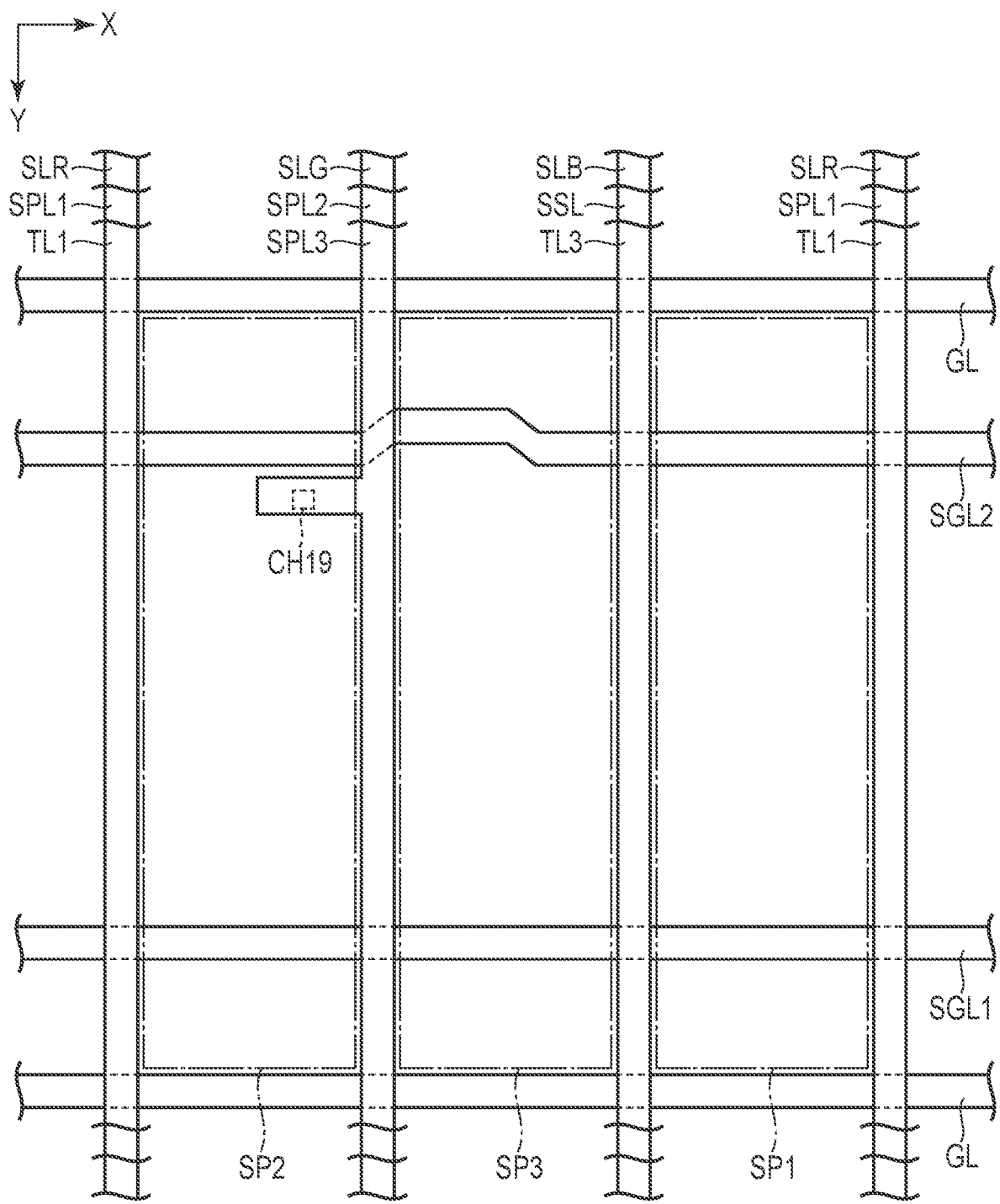
FIG. 7 is a schematic plan view showing an example of a structure applicable to the first substrate according to the embodiment.

FIG. 7 is a schematic plan view showing elements applicable to the first substrate SUB1 and interposed between the insulating layers 17 and 18 shown in FIG. 4. FIG. 7 also shows the pixel scanning line GL, pixel signal line SL, first scanning line SGL1 and second scanning line SGL2 shown in FIG. 5 in order to make the relationship in location among the elements easier to understand.

The third feeding line SPL3 has a branch portion (protruding portion) extending along the second direction Y so as to be superposed on the signal line SLG corresponding to the sub-pixel SP2 in planar view. At the branch portion, the third feeding line SPL3 is in contact with the relay electrode R11, which is placed in the opening of the sub-pixel SP2, through the contact hole CH19. Accordingly, the third feeding line SPL3 and the switching element SW3 are electrically connected to each other to allow the third voltage (VPP2) to be applied to the switching element SW3.

Figure 8:
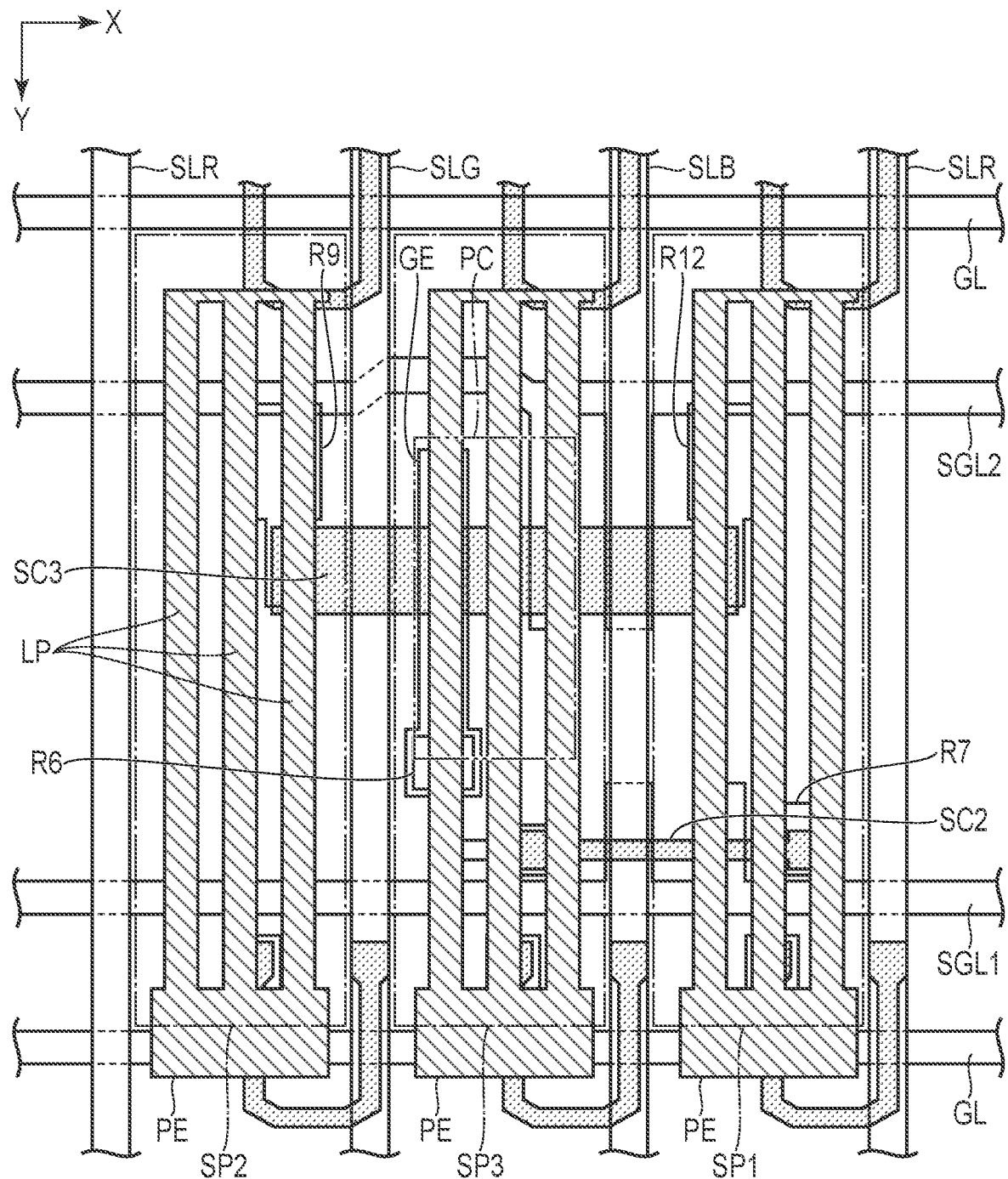
FIG. 8 is a schematic plan view showing an example of a structure applicable to the first substrate according to the embodiment.

FIG. 8 is a schematic plan view showing elements applicable to the first substrate SUB1 in order to describe the relationship in location between the pixel electrode PE and the sensor circuit for the sensor SS.

The pixel electrodes PE of the sub-pixels SP1, SP2 and SP3 have the same shape. Each of the pixel electrodes PE is placed in an area surrounded by two scanning lines GL and two signal lines SL. In the example of FIG. 8, the pixel electrode PE has three line portions LP extending along the second direction Y and arranged along the first direction X. The openings of the sub-pixels SP1, SP2 and SP3 overlap their respective line portions LP of the sub-pixels SP1, SP2 and SP3.

Each of the pixel electrodes PE is at least partly superposed on elements (switching elements SW2, SW3 SW4) constituting the sensor circuit for the sensor SS in planar view. For example, the pixel electrode PE of the sub-pixel SP2 is superposed on the semiconductor layer SC3, relay electrode R9 and the like in planar view. The pixel electrode PE of the sub-pixel SP3 is superposed on the semiconductor layer SC2, relay electrode R6, gate electrode GE, semiconductor layer SC3, branch portion of the second scanning line SGL2, and the like in planar view. The pixel electrode PE of the sub-pixel SP1 is superposed on the semiconductor layer SC2, relay electrode R7, branch portion of the first scanning line SGL1, semiconductor layer SC3, relay electrode R12, and the like in planar view. Note that the pixel electrode PE of the sub-pixel SP3 is superposed on the photoelectric conversion elements PC constituting the sensor SS in planar view.

According to the present embodiment described above, the sensor SS placed in the display area DA makes it possible to provide a display device DSP capable of detecting the surface unevenness of finger F that is in contact with or close to the display area DA.

In the present embodiment, the elements included in the sensor circuit for the sensor SS are distributed to their respective sub-pixels SP1, SP2 and SP3. It is thus possible, for example, to balance the aperture ratios of the sub-pixels SP1, SP2 and SP3 in comparison with the case where the elements are arranged only in one sub-pixel SP. That is, if the elements included in the sensor circuit for the sensor SS are arranged only in one sub-pixel SP, the aperture ratio of the one sub-pixel SP becomes extremely lower than that of the other two sub-pixels SP, with the result that the display quality may be degraded. According to the configuration of the present embodiment, the aperture ratios of the sub-pixels SP1, SP2 and SP3 can be balanced and thus the display quality can be prevented from being degraded.

In the present embodiment, the elements included in the sensor circuit for the sensor SS are distributed to the sub-pixels SP1, SP2 and SP3 by arranging some of the switching elements SW2 in the sub-pixel SP1 emitting red light, arranging some of the switching elements SW3 and SW4 in the sub-pixel SP2 emitting green light, and arranging the remaining elements in the sub-pixel SP3 emitting blue light. However, it may be determined in consideration of the influence of the aperture ratios of the sub-pixels SP1, SP2 and SP3 upon the display quality how the elements included in the sensor circuit for the sensor SS are distributed.

Figure 9:
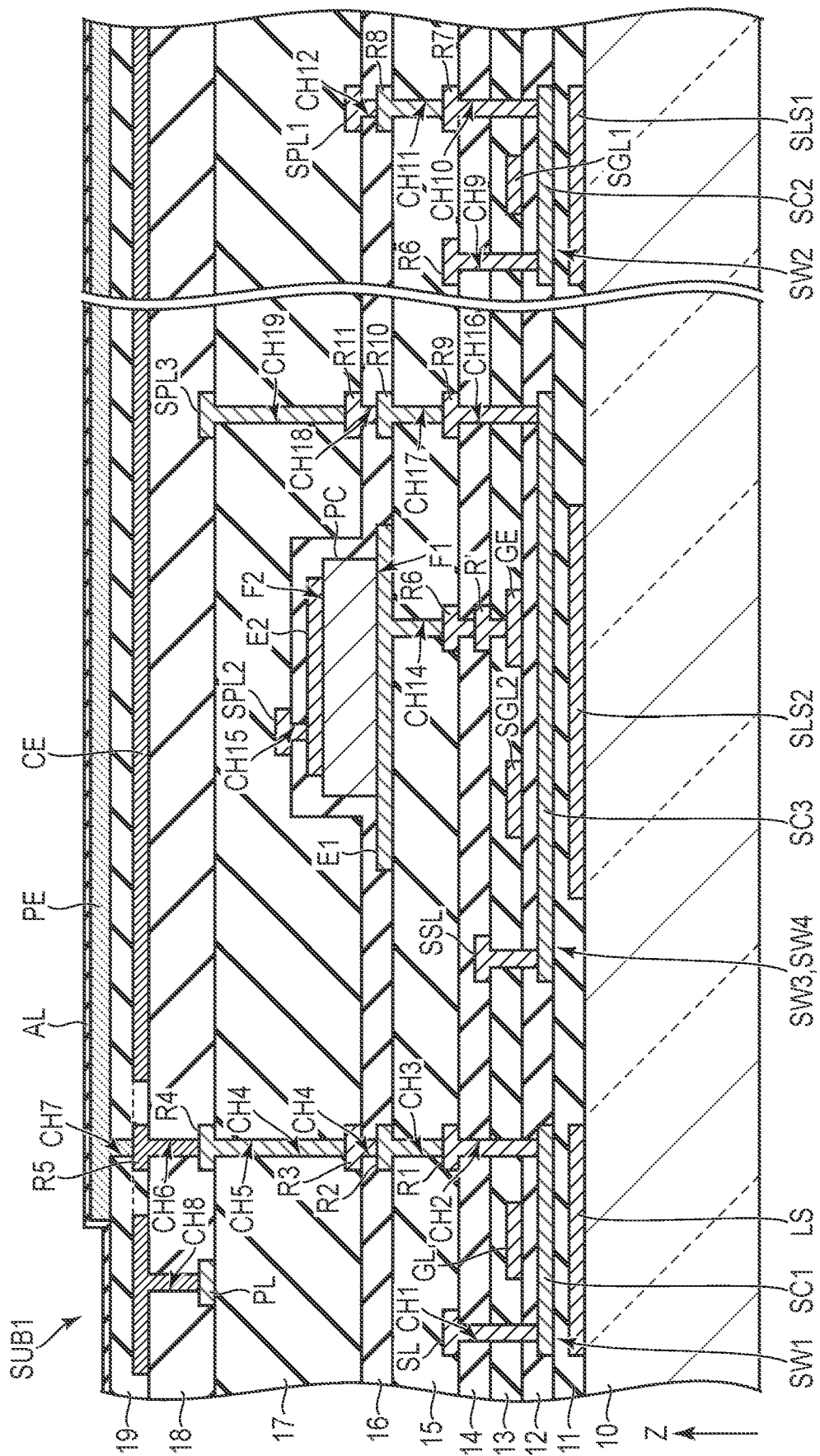
FIG. 9 is a schematic sectional view showing a structure of a first substrate according to a comparative example.

In addition to the above, various favorable advantages can be obtained from this embodiment. Further advantages of the present embodiment will be described with reference to the comparative example shown in FIG. 9. Note that the comparative example is intended to described some of the advantages that can be achieved by the present embodiment, and the advantages common to the comparative example and the present embodiment are not excluded from the scope of the present invention.

The configuration of the comparative example differs from that of the present embodiment shown in FIG. 4 in that the signal line SSL for the sensor is interposed between the insulating layers 13 and 14. It also differs from that of the present embodiment shown in FIG. 4 in that a relay electrode R' is interposed between the insulating layers 13 and 14.

In the configuration of the comparative example, the relay electrode R' and relay electrode R6 are opposed to each other with the insulating layer 14 formed of an inorganic material therebetween, and thus capacitance is formed between the relay electrodes R' and R6. This capacitance is added as parasitic capacitance to capacitance formed between the first and second electrodes E1 and E2 of the sensor SS. Since this parasitic capacitance affects the detection accuracy of the surface unevenness of finger F by the sensor SS, it is preferable that the parasitic capacitance is smaller.

In the configuration of the present embodiment, no electrode corresponding to the relay electrode R' of the comparative example is placed because the signal line SSL for the sensor is interposed between the insulating layers 16 and 17. The parasitic capacitance in the present embodiment can be made smaller than that in the comparative example.

In the configuration of the comparative example, furthermore, the signal line SSL is interposed between the insulating layers 13 and 14, and thus it is covered with the insulating layer 14 formed of an inorganic material. An insulating layer formed of an inorganic material is more likely to cause a step due to wiring than an insulating layer formed of an organic material (it is more difficult to cover a step due to wiring).

In the configuration of the present embodiment, the signal line SSL is located between the insulating layers 16 and 17 and above the insulating layer 15 formed of an organic material, and is covered with the insulating layer 17 formed of an organic material. Thus, the influence of a step due to the signal line SSL can be made smaller than that in the comparative example.

In addition, when a first substrate SUB1 is formed in the configuration of the comparative example, a step of forming a contact hole penetrating the insulating layers 12 and 13 and a step of forming the signal line SSL and the relay electrode R' between the insulating layers 13 and 14 are required, but when a first substrate SUB1 is formed in the configuration of the present embodiment, the signal line SSL can be formed in the same step as the step of forming the relay electrode R3 and the second feeding line SPL2; thus, the above two steps can be omitted. That is, the configuration of the present embodiment makes it possible to form the first substrate SUB1 with a smaller number of steps than the configuration of the comparative example.

Here is a brief description of a series of steps for forming the first substrate SUB1 in configuration of the present embodiment.

First, a light-shielding layer LS and a light-shielding layer SLS for a sensor are formed on the first base 10. Then, semiconductor layers SC1, SC2 and SC3 are formed on the insulating layer 11 which covers the light-shielding layers LS and SLS. A light doped drain region is formed in the semiconductor layers SC1, SC2 and SC3 by ion implantation. A scanning line GL, a first scanning line SGL1, a second scanning line SGL2 and a gate electrode GE are formed on the insulating layer 12 which covers the semiconductor layers SC1, SC2 and SC3. With the scanning line GL, first scanning line SGL1, second scanning line SGL2 and gate electrode GE as masks, the semiconductor layers SC1, SC2 and SC3 are doped with impurities to form a p+ region.

After the insulating layers 13 and 14 are formed, contact holes CH1, CH2, CH9, CH10, CH16 and CH20 penetrating the insulating layers 12, 13 and 14 are formed, and a contact hole CH13 penetrating the insulating layers 13 and 14 is formed. A signal line SL and relay electrodes R1, R6, R7, R9 and R12 are formed on the insulating layer 14. After the insulating layer 15 is formed, contact holes CH3, CH11, CH14, CH17 and CH21 penetrating the insulating layer 15 are formed. Relay electrodes R2, R8, R10, R13 and a first electrode E1 are formed on the insulating layer 15. A photoelectric conversion element PC is formed on the first electrode E1. The insulating layer 15 formed of an organic material has a flattening function, and the first electrode E1 and the photoelectric conversion element PC are formed on the flattened insulating layer 15. A second electrode E2 is formed on the photoelectric conversion element PC. After the insulating layer 16 is formed, contact holes CH4, CH12, CH15, CH18 and CH22 penetrating the insulating layer 16 are formed. Relay electrodes R3 and R11, a first feeding line SPL1, a second feeding line SPL2 and a signal line SSL for the sensor are formed on the insulating layer 16.

After the insulating layer 17 is formed, contact holes CH5 and CH19 penetrating the insulating layer 17 are formed. A feeding line PL, a relay electrode R4 and a third feeding line SPL3 are formed on the insulating layer 17. After the insulating layer 18 is formed, contact holes CH6 and CH8 penetrating the insulating layer 18 are formed. A relay electrode R5 and a common electrode CE are formed on the insulating layer 18. After the insulating layer 19 is formed, a contact hole CH7 penetrating the insulating layer 19 is formed. Thereafter, a pixel electrode PE is formed on the insulating layer 19, and an alignment film AL covering the pixel electrode PE is formed.

Various modifications can be made to the foregoing configuration disclosed in the present embodiment. In the present embodiment, the sensor circuit for the sensor SS is configured to include three switching elements SW2, SW3 and SW4, but the present invention is not limited to this configuration. The sensor circuit for the sensor SS may be configured to include two switching elements SW. Below is a description of a configuration in which the sensor circuit for the sensor SS includes two switching elements SW.

Figure 10:
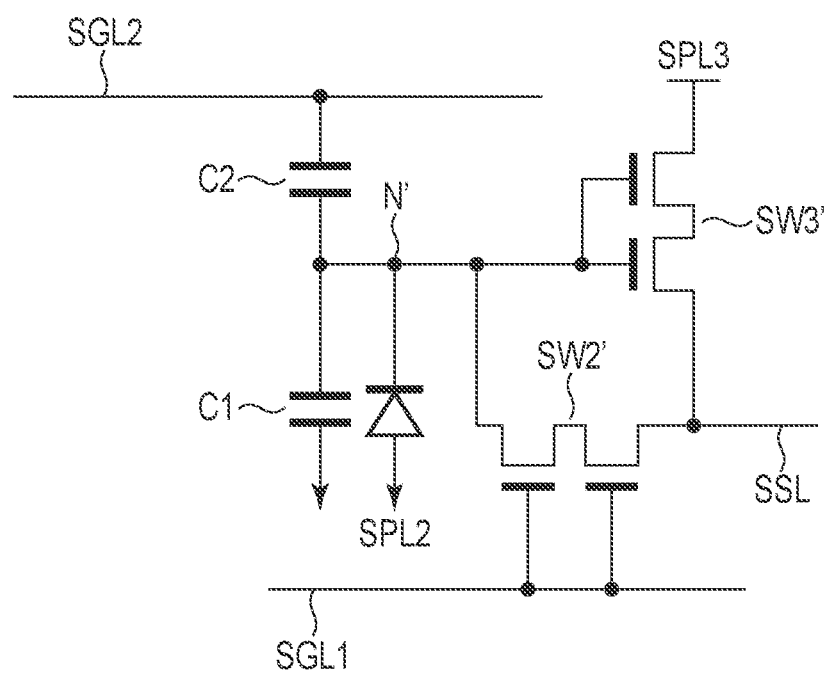
FIG. 10 is an equivalent circuit diagram showing an example of a configuration of a sensor circuit for a sensor according to the embodiment.

FIG. 10 is an equivalent circuit diagram showing an example of a configuration of the sensor circuit for the sensor SS included in the pixel PX according to the present embodiment. Below are descriptions of components included in the sensor circuit and the relationship in connection between the components.

The sensor circuit for the sensor SS includes a capacitor C1, a capacitor C2, a switching element SW2' and a switching element SW3'.

One electrode of the sensor SS is connected to a second feeding line SPL2 and the other electrode is connected to a node N'. The node N' is connected to one electrode of each of the capacitors C1 and C2, the source electrode of the switching element SW2' and the gate electrode of the switching element SW3'. The capacitor C1 holds capacitance that is formed between both the electrodes of the sensor SS according to the incidence of light. Capacitance held in the capacitor C2 is parasitic capacitance added to the capacitance held in the capacitor C1.

The gate electrode of the switching element SW2' is connected to a first scanning line SGL1, the source electrode thereof is connected to the node N' and the drain electrode thereof is connected to a signal line SSL for the sensor. The gate electrode of the switching element SW3' is connected to the node N', the source electrode thereof is connected to a third feeding line SPL3 and the drain electrode thereof is connected to the signal line SSL.

In FIG. 10, the switching elements SW2' and SW3' have a double-gate structure. They may have a single-gate structure or a multi-gate structure.

FIG. 11 is a schematic plan view showing a configuration of the first substrate SUB1 to which the sensor circuit of FIG. 10 is applied.

The scanning lines GL, first scanning line SGL1 and second scanning line SGL2 extend along the first direction X and are arranged along the second direction Y. The first and second scanning lines SGL1 and SGL2 are arranged adjacent to each other in the second direction Y. The first and second scanning lines SGL1 and SGL2 are interposed between adjacent two scanning lines GL. The signal lines SL extend along the second direction Y and are arranged along the first direction X.

The sub-pixels SP1, SP2 and SP3 are arranged in an area surrounded by two scanning lines GL arranged adjacent to each other along the second direction Y and two signal lines SL arranged adjacent to each other along the first direction X. The sub-pixels SP1, SP2 and SP3 each have an opening surrounded by the first and second scanning lines SGL1 and SGL2 and adjacent two signal lines SL.

The first scanning line SGL1 has a branch portion (protruding portion) extending along the second direction Y. The branch portion functions as a gate electrode of the switching element SW2'. A semiconductor layer SC2' is formed in an area superposed on the gate electrode of the switching element SW2' in planar view. The second scanning line SGL2 has a branch portion (protruding portion) extending along the second direction Y. The branch portion is superposed on the semiconductor layer SC2' in planar view to form a capacitor C2.

The semiconductor layer SC2' of the switching element SW2' is provided across the opening of the sub-pixel SP3 and the opening of the sub-pixel SP1, and overlaps the signal line SLB corresponding to the sub-pixel SP3.

An island-shaped relay electrode R30 is placed in the opening of the sub-pixel SP1 to overlap the semiconductor layer SC2'. The relay electrode R30 is in contact with the semiconductor layer SC2' through the contact hole CH30. An island-shaped relay electrode R31 is placed in the opening of the sub-pixel SP3 to overlap the semiconductor layer SC2'. The relay electrode R31 is in contact with the semiconductor layer SC2' through the contact hole CH31.

The relay electrode R31 is connected to the gate electrode GE' of the switching element SW3' through the contact hole CH32. The gate electrode GE' of the switching element SW3' is placed in the opening of the sub-pixel SP3, and stacked on the relay electrode R31 in planar view and overlapped with the signal line SLG corresponding to the sub-pixel SP2.

The semiconductor layer SC3' of the switching element SW3' is provided across the opening of the sub-pixel SP2 and the opening of the sub-pixel SP3, and overlaps the signal line SLG corresponding to the sub-pixel SP2. An island-shaped relay electrode R32 is placed in the opening of the sub-pixel SP2 to overlap the semiconductor layer SC3'. The relay electrode R32 is in contact with the semiconductor layer SC3' through the contact hole CH33.

An island-shaped relay electrode R33 is placed in the opening of the sub-pixel SP3 to overlap the semiconductor layer SC3'. The relay electrode R33 is in contact with the semiconductor layer SC3' through the contact hole CH34.

Figure 12:
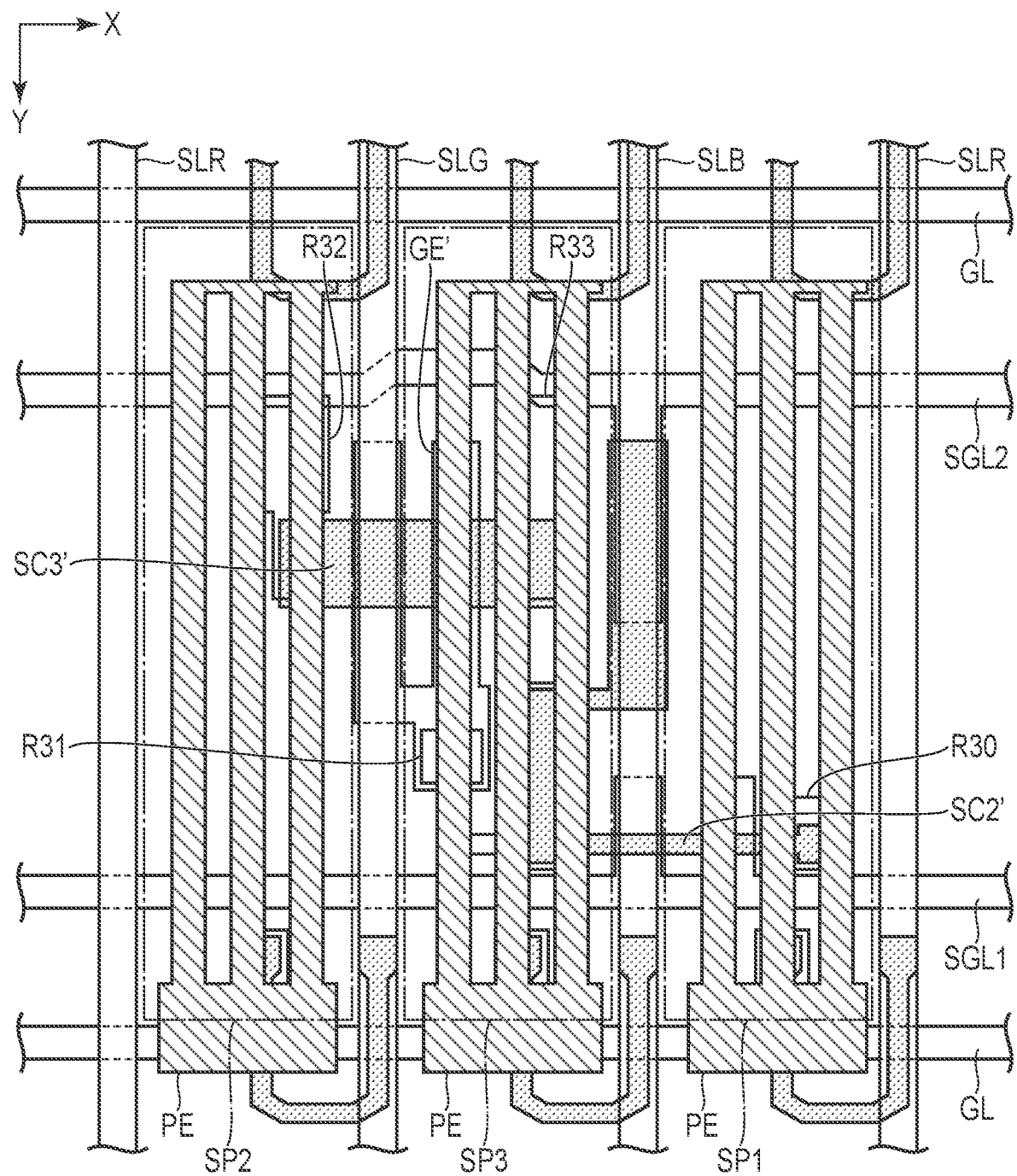
FIG. 12 is a schematic plan view showing a structure of the first substrate to which the sensor circuit of FIG. 10 is applied.

FIG. 12 is a schematic plan view showing a configuration of the first substrate SUB1 to which the sensor circuit of FIG. 10 is applied in order to describe the positional relationship between the pixel electrode PE and the sensor circuit for the sensor SS.

The pixel electrodes PE of the sub-pixels SP1, SP2 and SP3 have the same shape. Each of the pixel electrodes PE is placed in an area surrounded by two scanning lines GL and two signal lines SL. In the example of FIG. 12, the pixel electrode PE has three line portions LP extending along the second direction Y and arranged along the first direction X. The openings of the sub-pixels SP1, SP2 and SP3 overlap the line portions LP of the sub-pixels SP1, SP2 and SP3, respectively.

Each of the pixel electrodes PE at least overlaps elements (switching elements SW2' and SW3') constituting a sensor circuit for the sensor SS in planar view. For example, the pixel electrode PE of the sub-pixel SP2 is superposed on the semiconductor layer SC3', relay electrode R32 and the like in planar view. The pixel electrode PE of the sub-pixel SP3 is superposed on the semiconductor layer SC2', relay electrode R31, gate electrode GE', semiconductor layer SC3', relay electrode R33 and the like in planar view. The pixel electrode PE of the sub-pixel SP1 is superposed on the semiconductor layer SC2', relay electrode R30, branch portion of the first scanning line SGL1 and the like in planar view. Note that the pixel electrode PE of the sub-pixel SP3 is superposed on the photoelectric conversion element PC of the sensor SS in planar view.

As described above, even though the sensor circuit for the sensor SS is configured to include two switching elements SW2' and SW3', the same advantages as those in the case where the three switching elements SW2, SW3 and SW4 are distributed can be obtained because the switching elements are distributed to each of the sub-pixels SP1, SP2 and SP3. That is, the display quality can be prevented from decreasing.

The embodiment described above makes it possible to provide a display device capable of distributing the elements of the sensor circuit for the sensor SS to each of the sub-pixels SP1, SP2 and SP3 and preventing display quality from being lowered by incorporating the sensor SS (optical sensor).

In the present embodiment, the display device DSP is defined as a liquid crystal display device including an illumination device BL. The display device DSP is not limited thereto, but may be an organic electroluminescent display device including an organic light-emitting diode (OLED) as a display element.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a first substrate;
a second substrate opposed to the first substrate; and
a liquid crystal layer interposed between the first substrate and the second substrate, wherein:
the first substrate includes:
a base,
a sensor interposed between the base and the liquid crystal layer in a display area including pixels to output a sensing signal corresponding to light incident from alongside the liquid crystal layer, and
a sensor circuit including a plurality of switching elements and connected to the sensor;
the pixels include a first sub-pixel emitting light of a first color, a second sub-pixel emitting light of a second color and a third sub-pixel emitting light of a third color;
at least some of elements of the switching elements are arranged in each of areas where the first sub-pixel, the second sub-pixel and the third sub-pixel are arranged; and
a signal line for the sensor, which outputs the sensing signal from the sensor, is placed on a same layer as a feeding line connected to the sensor,
the sensor includes:
a photoelectric conversion element including a first surface opposed to the base and a second surface opposed to the liquid crystal layer,
a first electrode that is in contact with the first surface, and
a second electrode that is in contact with the second surface; and
the second electrode is in direct contact with the feeding line.

2. The display device of claim 1, wherein:
the first electrode is formed of a metal material; and
the second electrode is formed of a transparent conductive material.

3. The display device of claim 1, wherein each of the sensor signal line and the feeding line is covered with an insulating layer formed of an organic material,
each of the sensor signal line and the feeding line is in contact with the insulating layer formed of the organic material.

4. The display device of claim 1, wherein:
the first color is red;
the second color is green;
the third color is blue; and
the sensor is placed in an area where the third sub-pixel is placed.

5. The display device of claim 4, wherein:
the at least some of elements of the switching elements includes a first switching element, a second switching element and a third switching element,
a drain of the first switching element is connected to the first electrode and a gate of the second switching element,
a drain of the second switching element is connected to a source of the third switching element, and
a drain of the third switching element is connected to the sensor signal line.

6. The display device of claim 5, wherein
the first switching element includes a first semiconductor layer,
the third switching element includes a second semiconductor layer,
the first semiconductor layer overlaps each of the first sub-pixel and the third sub-pixel, and
the second semiconductor layer overlaps each of the first sub-pixel, the second sub-pixel, and the third sub-pixel.

7. The display device of claim 6, wherein
the second switching element includes the second semiconductor, and
the second semiconductor layer is shared by the second switching element and the third switching element.

8. The display device of claim 7, wherein
the third sub-pixel is connected to the first video signal line,
the second sub-pixel is connected to the second video signal line,
the sensor signal line overlaps the first video signal line, and
the feeding line overlaps the second video signal line.

9. The display device of claim 8, wherein
the third sub-pixel includes a pixel electrode,
the pixel electrode overlaps the photoelectric conversion element, and
the pixel electrode is located between the sensor signal line and the feeding line, in plan view.

10. The display device of claim 9, wherein
the pixel electrode includes a slit,
the silt overlaps each of the first semiconductor layer and the second semiconductor layer.

* * * * *